United States Patent
Kwiatkowski et al.

(10) Patent No.: US 9,908,437 B1
(45) Date of Patent: Mar. 6, 2018

(54) SEATING ARRANGEMENT

(71) Applicant: Pratt & Miller Engineering and Fabrication, Inc., New Hudson, MI (US)

(72) Inventors: Kevin R. Kwiatkowski, Ann Arbor, MI (US); Kris Houghton, Plymouth, MI (US); Celyn M. Evans, Milford, MI (US)

(73) Assignee: PRATT & MILLER ENGINEERING AND FABRICATION, INC., New Hudson, MI (US)

( * ) Notice: Subject to any disclaimer, the term of this patent is extended or adjusted under 35 U.S.C. 154(b) by 6 days.

(21) Appl. No.: 15/245,829

(22) Filed: Aug. 24, 2016

(51) Int. Cl.
| | |
|---|---|
| *B60N 2/01* | (2006.01) |
| *B60N 2/20* | (2006.01) |
| *B60N 2/30* | (2006.01) |
| *B60R 7/14* | (2006.01) |
| *B60N 2/22* | (2006.01) |
| *B60N 2/50* | (2006.01) |
| *F41H 7/04* | (2006.01) |

(52) U.S. Cl.
CPC ............ *B60N 2/01* (2013.01); *B60N 2/20* (2013.01); *B60N 2/22* (2013.01); *B60N 2/3047* (2013.01); *B60N 2/502* (2013.01); *B60R 7/14* (2013.01); *F41H 7/042* (2013.01)

(58) Field of Classification Search
CPC .......... B62D 55/10; B60N 2/502; B60N 2/22; F41H 7/042
See application file for complete search history.

(56) References Cited

U.S. PATENT DOCUMENTS

| | | | |
|---|---|---|---|
| 1,743,149 A | 1/1930 | Lyford | |
| 7,726,730 B2 * | 6/2010 | Peter | ............ B60N 2/071 296/65.13 |
| 8,752,470 B2 | 6/2014 | Kocher et al. | |
| 9,096,150 B2 * | 8/2015 | Cuddihy | ............ B60N 2/143 |

FOREIGN PATENT DOCUMENTS

WO    WO 2015083088 A1 *    6/2015    ......... B64D 11/0641

* cited by examiner

*Primary Examiner* — Pinel Romain
(74) *Attorney, Agent, or Firm* — Brinks Gilson & Lione

(57) ABSTRACT

An improved seating system is provided for vehicles, including military vehicles. Center-facing seats are staggered to provide for a narrow vehicle profile, improved ingress and egress, and increased blast survivability. Seats may be reclined or reclinable, and seats may have seat pans upwardly movable away from a center aisle between rows of seats to increase an effective width of the aisle for improved ingress and egress.

20 Claims, 5 Drawing Sheets

SEATING ARRANGEMENT

STATEMENT OF GOVERNMENT INTEREST

This disclosure was made in part with Government support. The Government may have certain rights in the disclosure.

TECHNICAL FIELD

This disclosure relates to seating structures, including those that may be used with vehicles such as military vehicles.

BACKGROUND

Conventionally, where vehicles accommodate multiple center-facing passengers in a vehicle, seating architecture has been provided so that passengers are seated across from one another such that their legs are at least partially interlocked. It may be desirable to develop a seating configuration to permit an even more narrow profile for the vehicle. This includes, for example, military vehicles, where a narrow vehicle profile may increase mobility through narrow pathways, minimize the vehicle as a target for enemy fire, and/or provide for improved blast performance.

Improvements to vehicle structures for mitigating blasts are always in need, as are improvements that may increase passenger safety, ease of ingress and egress, and survivability. Staggered seating, alone or in synergistic combination with other vehicle structure, may bring about one or more advantageous results.

DETAILED DESCRIPTION

All figures and examples herein are intended to be non-limiting; they are mere exemplary iterations and/or embodiments of the claims appended to the end of this description. Modifications to structure, materials, the order of steps in procedures, etc., are contemplated.

Generally, staggering seats rather than having seats directly facing and opposing one another provides a vehicle with a more narrow profile. A narrow vehicle profile may increase mobility through, for example, urban environments having narrow streets and pathways. A narrow profile may increase blast performance through, for example, a lower roll inertia. A narrow profile may also permit multiple different vehicle suspension combinations to be implemented, including one or more of multi-wheeled and track configurations. Additionally, a narrow profile minimizes a vehicle signature from at least certain angles, minimizing exposure as a target. Smaller than conventional seats, including seats with advanced ergonomic designs, may also lead to a lighter, more navigable vehicle.

Figure 1:
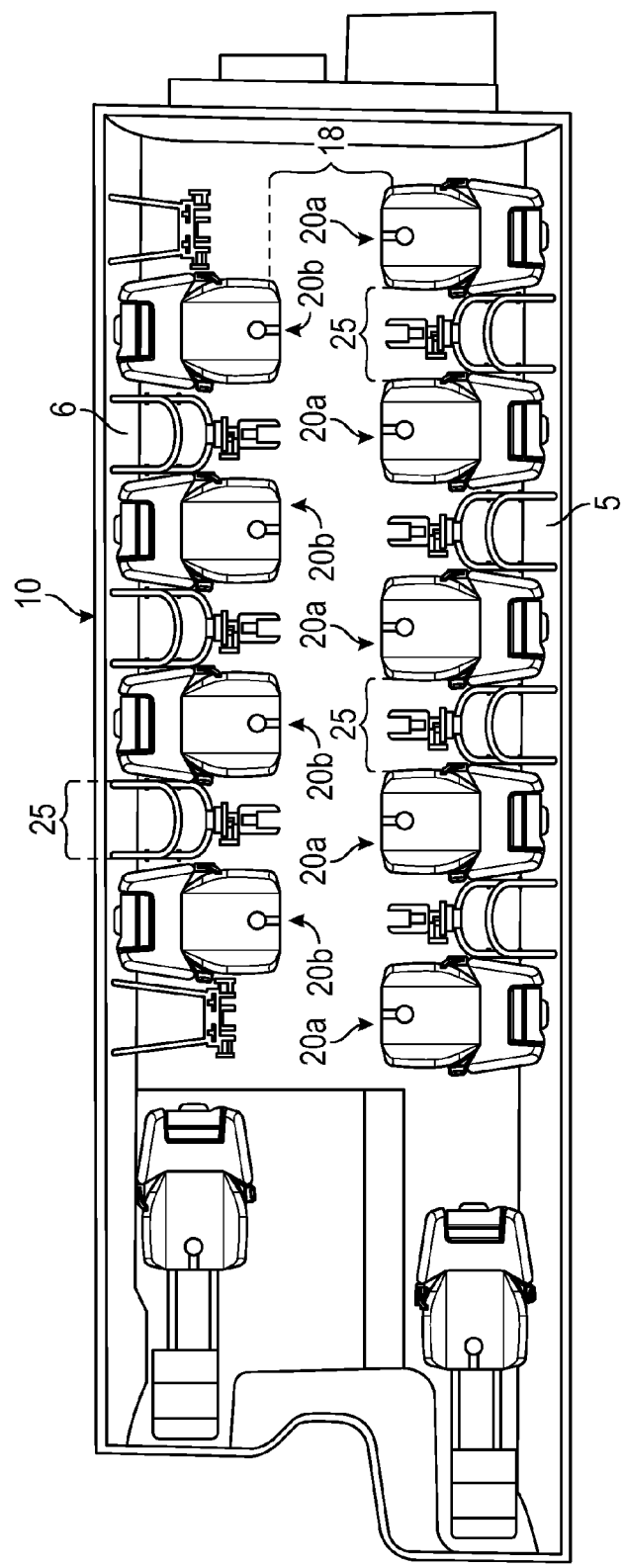
FIG. 1 is an exemplary narrow-profile military vehicle with staggered seating.

Referring to FIG. 1, vehicle 10 has a narrow profile. A plurality of seats are arranged in a staggered manner, so that seats 20a with backs toward one wall 5, in a first row, are not directly across from seats 20b with backs toward wall 6, in a second row. Some or all of seats 20 have a reclined position, which may mitigate passenger injury risk. Some or all of seats 20a and 20b may permanently be in a reclined position, while some or all of seats 20a and 20b may be adjustable to various positions including a reclined position. In some embodiments, none of seats 20a or 20b has a reclined position.

Staggered seats 20a and 20b permit vehicle 10 to have an especially narrow profile, since leg room is provided in spaces 25 between seats 20. Spaces 25 may also be include stowage space. That is, aisle 18 may shrink in width dimension to a degree that, without a flippable or pivotable seat pan on seats 20, aisle 18 would be difficult to navigate for purposes of ingress and egress.

Spaces 25 may permit passengers to sit across from one another without interlocking legs. For at least this reason, spaces 25 may reduce the risk that soldiers flail into one another during, for example, a blast or rollover event. Spaces 25, in combination with a plurality of reclined or reclineable seats 20 may provide a synergistic result for mitigation of risk of injury. Without being bound by theory, the reclining seats permit a vehicle hull to be smaller and to take an angled shaped that may be favorable to blast mitigation from, for example, IEDs. Hulls are the main frame or the main body of a vehicle such as a ship or a tank. Unexpectedly, a staggered seating arrangement in combination with reclined seats and vehicle hulls shaped to accommodate the reclined seats resulted in lower jump height in blast events.

Additionally, spaces 25 may increase ease of ingress and egress for soldiers by making storage of gear easy to put away or secure and easy to free or disengage. Spaces 25 may accommodate gear and may be equipped with securement mechanisms for gear. Indeed, spaces 25 permit more gear to be stored inside vehicles than in conventional vehicles.

The sizing and spacing of the seats 20a and 20b and spaces 25 may vary, depending on the shape and size of the vehicle to minimize opportunity for passenger feet and knees to run into each other, especially during a blast event.

Figure 2:
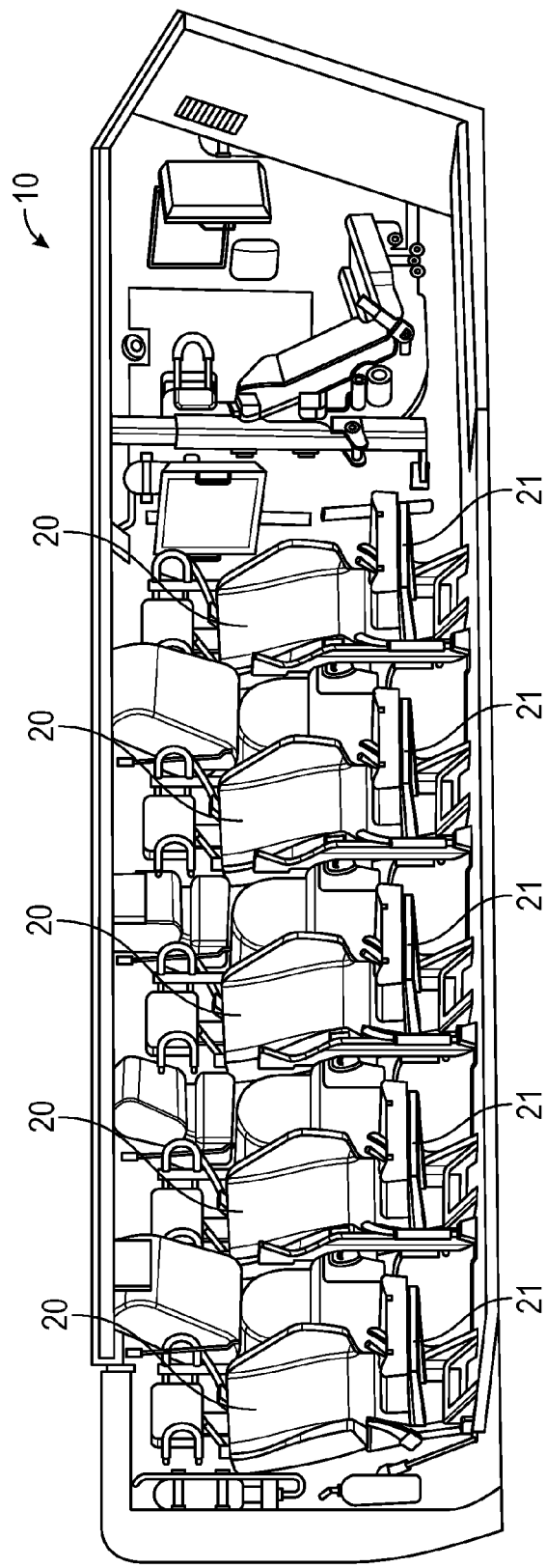
FIG. 2 is an exemplary narrow-profile military vehicle with staggered seating.
Figure 3:
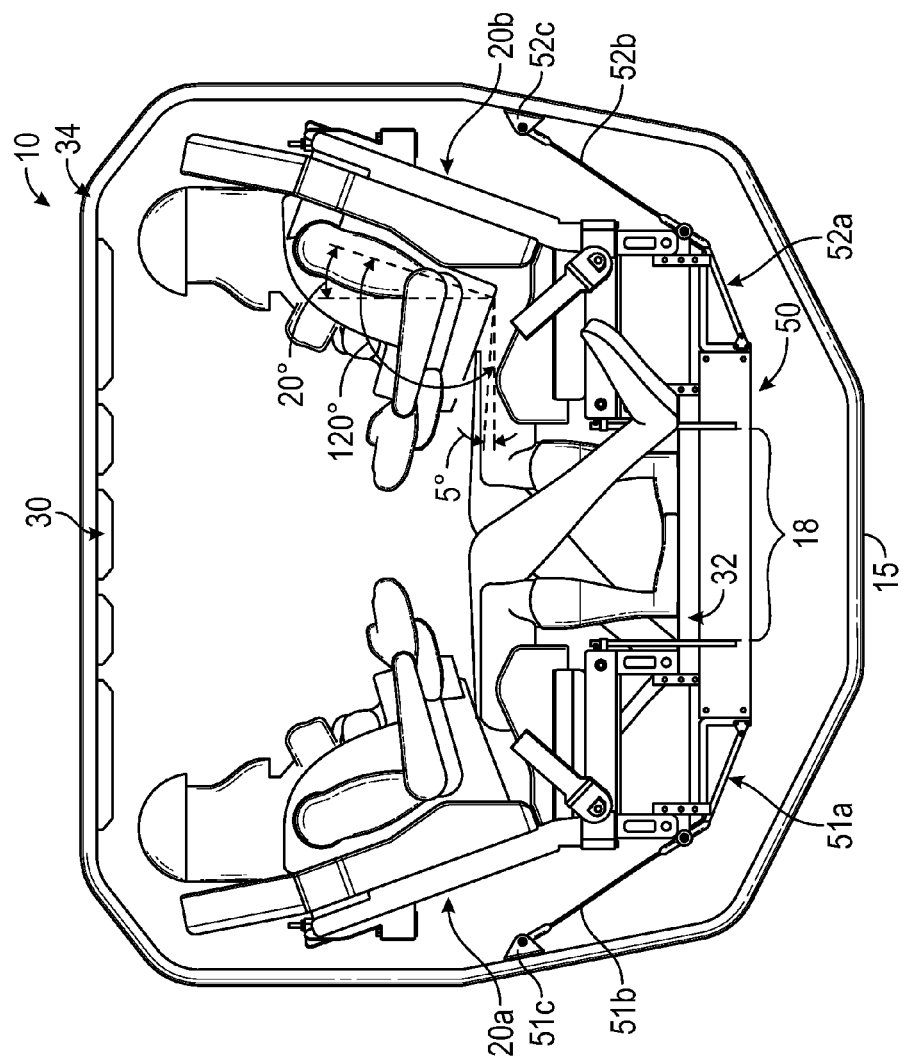
FIG. 3 is an exemplary vehicle including staggered seating.

Referring to FIGS. 1-3, an exemplary, non-limiting hull 15 for a vehicle 10 is shown with a first row of seats across from a second row of seats such that seats 20a are not directly across from seats 20b. Rather, individual seats 20 are across from spaces 25. In one embodiment, the aisle 18 has a width (from a center-facing edge of seat pan 21 to a center-facing edge of seat pan 21 of seat 20b) in a lower portion of aisle 18 (from the seats 20 down) of about 20 inches. As shown in FIG. 2, seat pans 21 support seats 20 in vehicle 10. Seat pans 21 may fold or flip or otherwise move away from the aisle 18 to increase the effective width of aisle 18, thereby increasing ease of ingress/egress. The effective width of aisle 18 may be varied depending on the profile of vehicle 10, and may differ at leg level from the effective width at shoulder level.

In the non-limiting embodiment of FIG. 3, the height of aisle 18 may vary due to the presence of energy absorbing material 30 on the inner surface of the ceiling of vehicle 10 or on top surface of a blast mat 32. In at least some portions of the hull 15, a ballistic liner 34 may cover at least a portion of an interior surface of the hull 15. Ballistic liners may range in thickness and location. In some embodiments, a ballistic liner 34 may be between an interior surface of hull 15 and energy absorbing material 30.

Energy absorbing material 30 may be made from any of a number of materials and may take any of a number of shapes. For example, rigid polyurethane foam shaped in negative stiffness (NS) honeycomb arrangements may be used. Energy absorbing material 30 may comprise lightweight aluminum honeycomb such as PLASCORE CRUSHLITE. Ballistic liners 34 may be made from any of a number of materials, some of which are available through Sioux Manufacturing Corporation (SMC) of North Dakota or BMI Defense Systems of Texas. Ballistic liners 34 may be light weight, and may include woven and non-woven materials, KEVLAR, and flame-resistant materials or coatings. Blast mats 32 may be made from any of a number of materials, including thermoplastic polyurethane. Blast mats 32 available through Skydex Technologies of Colorado may be suitable, as well as blast mats 32 available through US Youth Sports of Missouri.

In the non-limiting embodiment of FIG. 3, seats 20a and 20b are mounted on a floor 50 that is isolated from direct contact with hull 15 by its mounting apparatus including, on one side, component members 51a, 51b, 51c, and on the opposite side, component members 52a, 52b and 52c. Isolated floor 50 has a sufficient clearance from an interior surface of hull 15. Passengers in seats 20a and 20b have a sufficient head clearance to accommodate fully adorned soldiers of various sizes. Passenger in seat 20b may have his or her H-point (where the passenger pivots, through the hip) a sufficient distance above the upper surface of the floor to accommodate soldiers of various sizes.

Passenger in seat 20b is shown has having a reclined position of 20 degrees clockwise from the vertical of the H-point, the H-point being the origin. The leg angle is shown as being 5 degrees counter-clockwise from the horizontal of the H-point, the H-point being the origin. That is, in the example, there is a 105 degree angle between the back angle and the leg angle. This position is an exemplary one for a squad seat for ingress and egress. For riding in seat 20b, an exemplary recline position may be about 30 degrees clockwise from the vertical of the H-point, and the leg angle may be about 15 degrees clockwise from the horizontal of the H-point. That is, in this example, there is a 105 degree angle between the back angle and the leg angle. Different recline angles are contemplated, including a range of from about 5 or 15 to about 40 or 45 degrees from the vertical for crew and squad seats. The crew and squad seats may be fixed in a reclined position or may be adjustable. The angle between the back angle and the leg angle can range from about 95 to about 110 degrees. Other configurations and angles of recline angles are contemplated. The shape of the hull accommodates the angle by which the seats are reclined.

Figure 4:
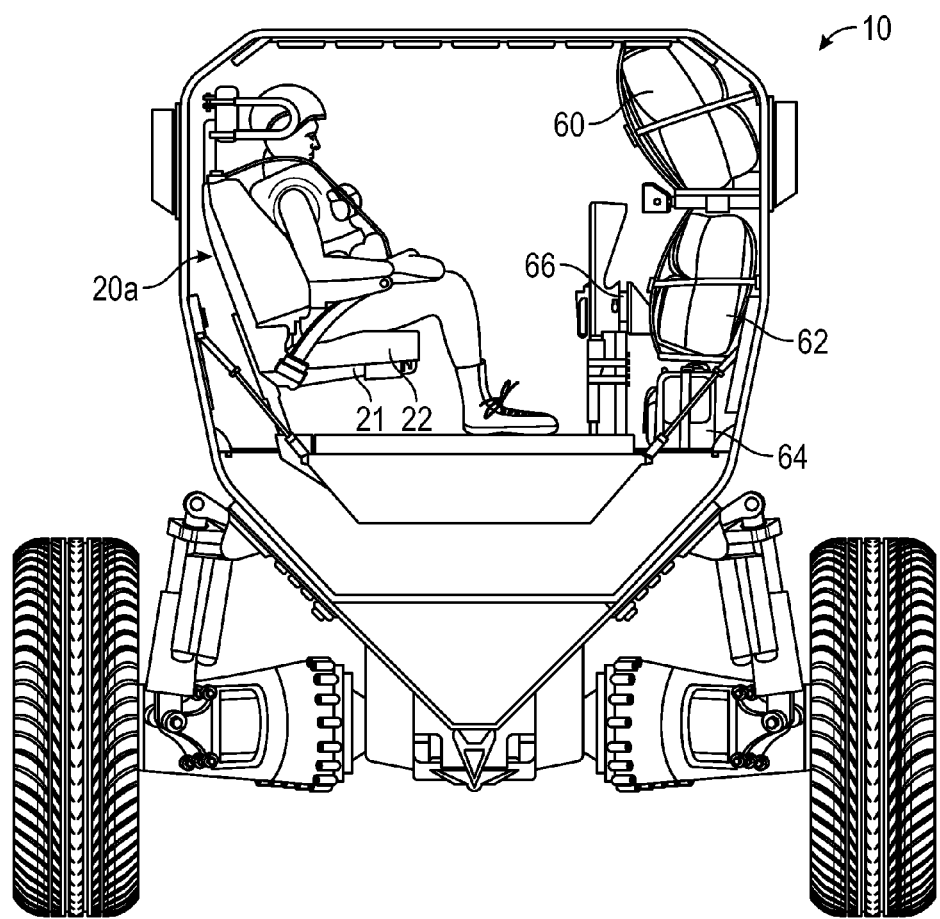
FIG. 4 is a view of an exemplary seat directly across from stowage space.

Referring to FIG. 4, vehicle 10 is shown to illustrate what is across from a seat 20a with seat pan 21 supporting seat cushion 22. In this non-limiting example, space 25 (as numbered in FIG. 1) includes stowage compartments 60, 62 and 64 for gear or other items to be secured. Additionally, securement device 66 provides a mechanism to contain weapons, including during travel. In the depicted embodiment, a gun is stowed and pointed in a downward direction.

Figure 5:
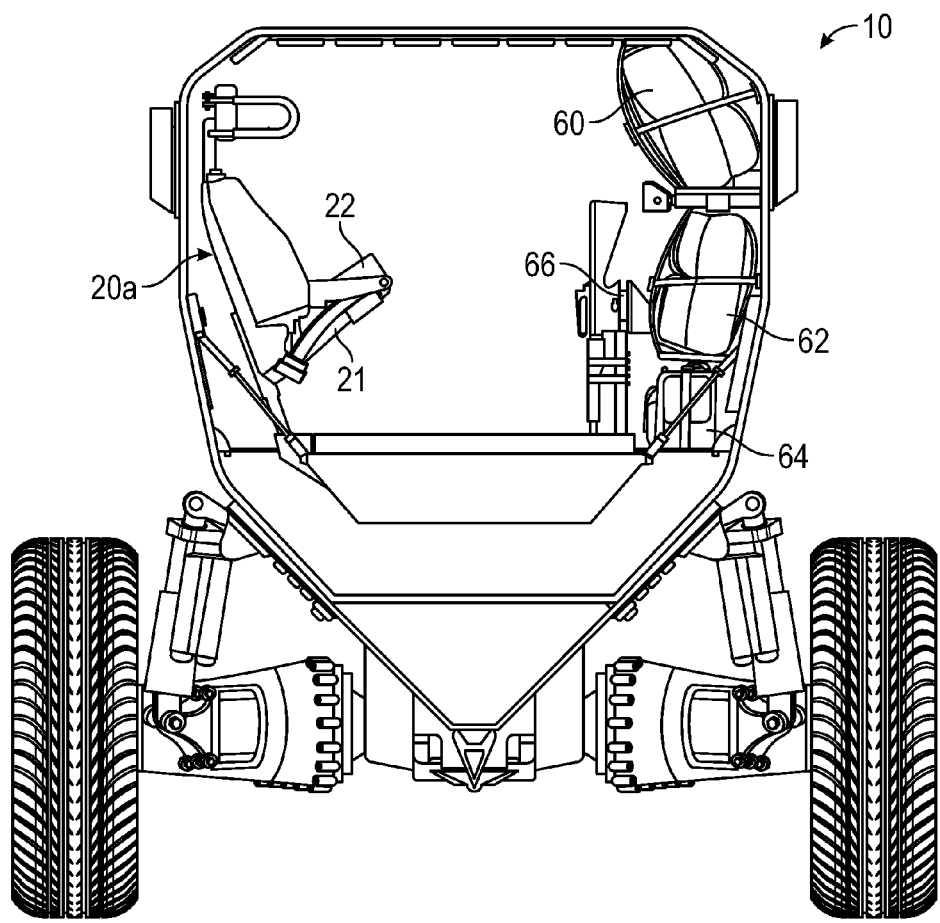
FIG. 5 is a view of an exemplary seat directly across from stowage space.

Referring to FIG. 5, seat pans 21 can be pivoted or flipped or folded away from the aisle to increase the effective aisle width during ingress and egress activity. Many mechanisms for upward pivoting and holding may be implemented, including but not limited to spring loaded mechanisms. FIG. 5 shows an exemplary seat 20a for seat cushion 22 having an exemplary seat pan 21 folded and releasably held in an upright position so the effective width of aisle 18 (as labeled in FIG. 1) is increased. Seat pan 21 can optionally be biased to remain in the upright position unless or until occupied using any of a number of mechanisms.

Although the steps of the above-described processes have been exemplified as occurring in a certain sequence, such processes could be practiced with the steps performed in a different order. It should also be understood that certain steps could be performed simultaneously, that other steps could be added, or that certain steps could be omitted. In other words, the descriptions of the processes are provided for the purpose of illustration, and should not limit the claimed invention.

Accordingly, it is to be understood that the above description is intended to be illustrative and not restrictive. Many embodiments and applications other than the examples provided would be apparent upon reading the disclosure. For example, it is contemplated that spacing and sizing of seats could be adjusted for ergonomics or to standardize to about 90% of the military population. It is also contemplated that indirect driving methods such as driving through providing input to screens, yokes and/or seat movement could be integrated with the described seating arrangements. The scope of the invention should be determined with reference to the appended claims along with the full scope of equivalents. It is intended that future developments will occur, and that embodiments of the disclosed systems and methods will incorporate and be incorporated with such future developments.

Use of singular articles such as "a," "the," "said" together with an element means one or more of the element unless a claim expressly recites to the contrary.

What is claimed as new and desired to be protected by Letters Patent of the United States is:

1. A narrow-profile vehicle, comprising:
   a first row of spaced apart seats facing center;
   a second row of spaced apart seats opposite the first row, the second row also facing center, wherein each seat in the first row is directly across from space between seats in the second row and each seat in the second row is directly across from space between seats in the first row; and
   each seat in each row being reclineable to an angle of at least about 45 degrees from a vertical axis.

2. The vehicle of claim 1, wherein the seats are reclineable from about 15 to about 40 degrees from a vertical axis.

3. The vehicle of claim 1, wherein the seats are reclined from about 5 to about 45 degrees from a vertical axis.

4. The vehicle of claim 1, wherein the seats are crew seats or squad seats and are reclined from about 20 to about 30 degrees from a vertical axis.

5. The vehicle of claim 1, wherein a lower portion of a vehicle frame is V-shaped at an angle akin to the recline angle of the seat.

6. The vehicle of claim 1, wherein the seats are mounted to a floor suspended from a vehicle structure.

7. The vehicle of claim 6, wherein the floor is covered at least in part with a blast mat.

8. The vehicle of claim 1, wherein at least a portion of an interior surface of the vehicle is covered with an energy absorbing material.

9. The vehicle of claim 1, wherein seats in at least one of the first or second row each have seat pans upwardly pivotable away from a center aisle, the center aisle being between the first and the second row of seats.

10. A vehicle, comprising:
a first row of a plurality of spaced apart reclined seats facing center;
a second row of a plurality of spaced apart reclined seats opposite the first row, the second row also facing center, wherein each seat in the first row is directly across from space between seats in the second row and each seat in the second row is directly across from space between seats in the first row, each space between seats including a structure for stowage of gear;
an aisle between the first row and the second row; and
a plurality of seat pans of at least one seat in at least one of the first or second row are biased upwardly, thereby increasing an effective width of the aisle for ingress and egress when unoccupied.

11. The vehicle of claim 10 wherein the structure for stowage comprises a securement mechanism for a weapon.

12. The vehicle of claim 10 wherein each seat is reclined from about 5 to about 45 degrees from a vertical axis.

13. The vehicle of claim 12 wherein each seat has an adjustable reclining mechanism.

14. The vehicle of claim 12 wherein the seats are mounted to a floor suspended from a vehicle structure.

15. The vehicle of claim 14 wherein the vehicle includes walls angled to accommodate the recline angle of the seats.

16. A vehicle, comprising:
a first row of spaced apart seats facing center, the seats having seat pans biased upwardly;
a second row of spaced apart seats opposite the first row, the second row also facing center and having seat pans biased upwardly, wherein each seat in the first row is directly across from space between seats in the second row and each seat in the second row is directly across from space between seats in the first row;
each space between seats comprises a structure or compartment for stowage of gear; and
each seat in each row being reclined at an angle of from about 5 degrees to about 45 degrees from a vertical axis.

17. The vehicle of claim 16 wherein the seats are mounted to a floor suspended from a vehicle hull.

18. The vehicle of claim 17 further including a blast mat on the floor.

19. The vehicle of claim 16 wherein the vehicle has walls angled to accommodate the recline angle of the seats.

20. The vehicle of claim 16 wherein the structure for stowage comprises a securement mechanism for a weapon.

* * * * *